United States Patent
Kershaw et al.

(10) Patent No.: US 8,010,772 B2
(45) Date of Patent: Aug. 30, 2011

(54) PROTECTED FUNCTION CALLING

(75) Inventors: Daniel Kershaw, Cambridge (GB); Lee Douglas Smith, Sawston (GB); David James Seal, Cambridge (GB); Richard Roy Grisenthwaite, Guilden Moreden (GB)

(73) Assignee: ARM Limited, Cambridge (GB)

( * ) Notice: Subject to any disclaimer, the term of this patent is extended or adjusted under 35 U.S.C. 154(b) by 774 days.

(21) Appl. No.: 12/068,448

(22) Filed: Feb. 6, 2008

(65) Prior Publication Data

US 2008/0250216 A1 Oct. 9, 2008

(30) Foreign Application Priority Data

Apr. 3, 2007 (GB) .................................. 0706491.8

(51) Int. Cl.
*G06F 7/38* (2006.01)
*G06F 9/00* (2006.01)
*G06F 9/44* (2006.01)

(52) U.S. Cl. ............. 712/226; 712/229; 726/17; 726/26
(58) Field of Classification Search .................. 712/226, 712/229; 726/17, 21

See application file for complete search history.

(56) References Cited

U.S. PATENT DOCUMENTS

| | | | |
|---|---|---|---|
| 4,087,856 A | 5/1978 | Attanasio | |
| 4,545,012 A | 10/1985 | Clancy et al. | |
| 4,809,160 A * | 2/1989 | Mahon et al. | ...................... 726/4 |
| 5,107,443 A | 4/1992 | Smith et al. | |
| 6,633,963 B1 | 10/2003 | Ellison et al. | |
| 7,134,006 B2 | 11/2006 | Flanigan | |
| 2001/0052054 A1 | 12/2001 | Franke et al. | |
| 2004/0158736 A1 | 8/2004 | Watt et al. | |
| 2004/0168047 A1 * | 8/2004 | Fukai et al. | ................... 712/229 |
| 2005/0030824 A1 | 2/2005 | Kreuchauf et al. | |
| 2005/0114616 A1 | 5/2005 | Tune et al. | |
| 2005/0262568 A1 | 11/2005 | Hansen et al. | |

FOREIGN PATENT DOCUMENTS

| | | |
|---|---|---|
| EP | 0 859 319 | 8/1998 |
| GB | 2 260 004 | 3/1993 |
| JP | 57-83850 | 5/1982 |
| JP | 2004-280801 | 10/2004 |

OTHER PUBLICATIONS

U.S. Appl. No. 12/068,449, filed Feb. 6, 2008, Kershaw et al.
Office Action mailed Jun. 17, 2010 in co-pending U.S. Appl. No. 12/068,449.

* cited by examiner

*Primary Examiner* — Alford W Kindred
*Assistant Examiner* — Jesse R Moll
(74) *Attorney, Agent, or Firm* — Nixon & Vanderhye P.C.

(57) ABSTRACT

Memory address space is divided into domains and instruction access control circuitry is used to detect when the memory address from which an instruction to be executed is fetched has crossed a domain boundary and changed and in such cases to conduct a check to ensure that the instruction within the new domain is a permitted instruction of a permitted form. The permitted instruction can be arranged to be a no operation instruction other than in respect of the instruction access control circuitry, in order to assist backward compatibility.

23 Claims, 7 Drawing Sheets

M = general memory management (MMU enable, translation table pointer, endianess, DCSR, DCR)

E = exception control - (vector table pointers, vector enable)

CM = cache maintenance

S = SMC instruction enable

PROTECTED FUNCTION CALLING

BACKGROUND OF THE INVENTION

1. Field of the Invention

This invention relates to the field of data processing systems. More particularly, this invention relates to mechanisms for improving the security of operation of data processing systems.

2. Description of the Prior Art

Increasing the security of operation of data processing systems is becoming an important issue. As an example, a data processing system may be used to process protected data, such as copyright protected material, using digital rights management systems. Such systems may require security checking code to be executed and security checks passed before permitting further processing, such as playback of copyright material, to proceed. The security mechanisms may be password checking or license checking mechanisms. A known form of attack against such security mechanisms is to attempt to bypass the security program code, such as the password checking code, and jump into the program at a later point with a view to processing continuing as if the security check had been passed. In order to try and resist such attacks, it is known to provide mechanisms such as function gating as supported in the Intel IA32 architecture and specific entry and exit opcodes used to denote function entry and exit points. However, such mechanisms have a disadvantageous amount of additional overhead associated with them and are difficult to add to existing computer code without significant rewriting and restructuring of that code.

It is known to make published entry and exit points available at compile time across different software modules. For example, . . . "National Semiconductor NS32532-20/NS32532-25/NS32532-30 High-Performance 32-Bit Microprocessor"—May 1991 describes a system having ENTER and EXIT instructions which enable a programmer to make calls between modules, which are distinct program entities in their own right. The aim is to load modules into physical memory at addresses determined at run time, but still provide a mechanism which allows the relative addresses of functions within each module to be established at compile time. At run time the OS establishes and maintains link tables in memory, which combine runtime module location and the relative addresses of functions within a module to provide yield absolute call addresses.

VAX-11 Architecture Reference Manual EK-VAXAR-RM-001, 20 May 1982 (Revision 6.1) describes a system having procedure call instructions. Three instructions are used to implement a standard procedure calling interface. Two instructions implement the CALL to the procedure; the third implements the matching RETURN. The CALLG instruction calls a procedure with the argument list actuals in an arbitrary location. The CALLS instruction calls a procedure with the argument list actuals on the stack. Upon return after a CALLS this list is automatically removed from the stack. Both call instructions specify the address of the entry point of the procedure being called. The entry point is assumed to consist of a word termed the entry mask followed by the procedure's instructions. The procedure terminates by executing a RET instruction. The system requires the presence of the entry mask at the entry point. The entry must take place in accordance with required alignment.

The entry mask specifies the subprocedure's register use and overflow enables: e.g. a 16-bit word with bits 0-11 masking r0-r11, 12-13, 14 and 15 labeled IV and DV (integer and decimal overflow enables).

On CALL the stack is aligned to a longword boundary and the trap enables in the PSW are set to a known state to ensure consistent behavior of the called procedure. Integer overflow enable and decimal overflow enable are affected according to bits 14 and 15 of the entry mask respectively.

Floating underflow enable is cleared. The registers R11 through Rf1 specified by bits 11 through 0 respectively are saved on the stack and are restored by the RET instruction. In addition, PC, SP, FP, and AP are always preserved by the CALL instructions and restored by the RET instruction.

Budiu, Erlingsson and Abadi "Architectural Support for Software-Based Protection", ASID'06 Oct. 21, 2006 discloses security improvements by extending CPU architectures by adding a label (cfilable), "checked jump" instructions and a new register, cfi_register. To perform a checked jump, software loads the cfi_register with the value of the label expected to be found in cfilable at the entry point to the required function subsequently called by the "checked jump" instruction. If the value in the cfi_register and cfilable are found to match during a "checked jump" then the value in cfi_register is zeroed, and execution allowed to proceed. If during a "checked jump", the cfi_register contains a non-zero value, an exception is raised. This extends the idea of a required data tag at the call location for use in security control.

With these approaches difficulties will be encountered when one tries to integrate legacy software which has not implemented cfilable values at function entry points, with newer software which intends for them to be present. As a result, the whole of a system's software will have to be upgraded at the same time to take advantage of this new feature, which may well be infeasible—as it is possible no one single company may have access to all the required source code.

SUMMARY OF THE INVENTION

Viewed from one aspect the present invention provides apparatus for processing data, said apparatus comprising:

a memory addressable with a memory address having a value within a memory address space, said memory address space having at least a first domain and a second domain, a domain comprising a set of memory addresses;

instruction fetching circuitry coupled to said memory and operable to fetch a sequence of program instructions using respective memory addresses within said memory address space;

instruction access control circuitry coupled to said instruction fetching circuitry and responsive to a fetch of a first instruction associated with a first memory address within said first domain followed by a fetch of a second instruction associated with a second memory address within said second domain:

(i) to determine from an instruction code of said second instruction if said second instruction is a permitted instruction that is permitted to execute when commencing executing instructions associated with said second domain after accessing instruction associated with said first domain; and (ii) if said second instruction is not a permitted instruction, then to trigger an access violation response; wherein:

said memory address space comprises a plurality of domains, each having respective programmable capabilities associated therewith indicating which of the domain transitions into the other domains are or are not to be subject to permitted instruction checking.

The present technique recognises that there is a strong relationship between the memory location storing a program instruction seeking to make a function call and the need to check that the function call is being made to a legitimate entry point into the target code. As an example, an operating system will often be used to control many of the aspects of the security associated with data processing system and function calls within that operating system itself will pose a relatively unlikely source of security threats of the above mentioned type. However, not all parts of an operating system are equally secure and robust. Accordingly, function calls to points within the operating system from instructions stored at memory locations outside of those storing the robust portions of the operating system program instructions are more likely to represent a security threat and accordingly justify the overhead associated with adding a call protection mechanism. The present technique focuses on these potential vulnerabilities by providing a mechanism which identifies a change from executing instructions within a first domain (a set of memory addresses which may be contiguous or non contiguous within the memory space) to a second memory domain and upon detecting such a domain change determining that the first instruction in that second domain is a permitted instruction. Thus, function call targets which are intended to be called from outside of the domain in which they reside are arranged to correspond to permitted instructions. Calls to other instructions from outside of the domain concerned, which other instructions are not permitted instructions, will be detected as access violating instructions and trigger an access violation response. The present technique provides a low overhead mechanism for improving security by focussing that mechanism on inter-domain calls. It achieves this using a requirement for a permitted instruction at the call target location rather than a data tag.

The present technique enhances security using a small number (ie one per instruction set) of OP codes, e.g. from the NOP code space of the desired instruction set, and does not require the use of a specific branch instruction to work. Furthermore, the technique allows the inter-working of target branch checking code, and legacy code not designed for branch target checking—where:

| Target Code | Caller Code | Benefit |
| --- | --- | --- |
| Legacy | Legacy | No benefit |
| Legacy | Branch Checking | Function returns can benefit from extra security |
| Branch checking | Legacy | Function call entries benefit from extra security |
| Branch checking | Branch checking | Calls and returns can both benefit from extra security. |

These benefits can be achieved in relation to legacy code since this enhanced security is provided by the operating system's management of the domains with no requirement for special labels to be placed within the code when compiled.

It will be appreciated that the permitted instructions could take a variety of different forms. They may be permitted branch target instructions. However, it is also possible that a domain boundary may be crossed by normal sequential program execution and so it may be arranged that the first instruction within a new domain when crossing such a boundary in sequential execution is a permitted instruction when such a sequential boundary crossing is intended to be a permitted entry point.

In the context of data processing systems employing a plurality of program instruction sets, security may be enhanced by providing each program instruction set with at least one permitted branch target instruction and ensuring that the instruction access control circuitry determines whether or not the second instruction is a permitted instruction for the instruction set that contains said second instruction. It may be that the active instruction set for the second instruction is from the same instruction set as for the first instruction, or it could be that a switch of instruction set is associated with a move from the first instruction to the second instruction, in which case the intended active instruction set for the second instruction is the one against which a check for the presence of the permitted instruction is made.

Whilst it will be appreciated that the permitted instructions can have a wide variety of different forms, such as a stack push operation which is typically conventionally found at branch target locations, enhanced backward compatibility is achieved when the permitted instruction is processed as a no operation instruction by processing circuitry other than the instruction access control circuitry. If the instruction access control circuitry is not present, such as in a previous version of the hardware, then the program code will operate without error, merely ignoring the no operation instruction when accounted, although it will do so without the protected call functionality and accordingly at a lower level of security.

Whilst it will be appreciated that the present technique could be used in a system having only two domains with changes between the domains giving rise to checks for a permitted first instruction, or a permitted instruction at some fixed relation to the entry. The flexibility of the system is improved when the memory address space comprises a plurality of domains, each having respective programmable capabilities associated therewith and including a programmable capability to indicate for which other of the domains a check for a permitted target instruction is to be made when moving to those other domains. Thus, the permitted instruction checking can be associated with particular domain transitions in a programmable manner allowing program code to be effectively partitioned depending upon its storage location within the memory address space as to how it is to be treated by the permitted instruction checking mechanism. The information specifying whether checking is to be performed can be associated with either the calling domain or the target domain.

As well as checking that the target instruction is a permitted instruction, it is also possible to additionally check that the first instruction (typically a calling instruction) is a permitted instruction.

It will be appreciated that whilst the above has at some points used as examples branch instructions calling functions with the security checking taking place in respect of the branch target instruction, the same techniques of permitted instruction checking can be used when moving between the domains on returning from calls, i.e. a check can be made to ensure that a permitted return point is being used (e.g. to ensure that called functions return through security validation code where this is intended by the system designer).

Whilst it would be possible to treat execution of the first instruction and the second instruction as an atomic entity between which it was not possible to take an exception, this would disadvantageously increase latency. Accordingly, at least some embodiments can use a mechanism such that when an exception occurs between the first instruction and the second instruction, a saved status register stores data identifying the first domain such that upon a return from processing the exception the instruction access control circuitry can identify the first domain associated with the first instruction and so are appropriately control access to the second instruction depending upon whether or not permitted instruction checking is required for that particular inter-domain transition. It would be possible in alternative embodiments to restart with the first instruction.

Whilst the present techniques can be used with purely physical memory address space, they are well suited to systems in which the memory address space is a virtual memory address space. In this context, the instruction access control mechanisms can be readily integrated with the memory management circuitry mapping virtual to physical addresses and such memory management circuitry can also store the domain specifying data in convenient and well structured manner integrated with the other processing mechanisms of the system thereby incurring relatively little additional processing overhead.

The programmable capabilities of the domains can be held in a number of different ways within the system, such as within a protected region within the memory address space, but are advantageously held within programmable configuration registers, as such programmable configuration registers can generally speaking be subject to higher levels of security control and accordingly may be made less vulnerable to security attack.

The access violation response can take a number of different forms. Examples of such forms are a memory abort, execution of domain violation exception handling code, execution of access violation exception handling code and execution of undefined instruction exception handling code.

Viewed from another aspect the present invention provides a method of processing data, said method comprising the steps of:

storing program instructions within a memory addressable with a memory address having a value within a memory address space, said memory address space having at least a first domain and a second domain, a domain comprising a set of memory addresses;

fetching a sequence of program instructions using respective memory addresses within said memory address space;

in response to a fetch of a first instruction associated with a memory address within said first domain followed by a fetch of a second instruction associated with a memory address within said second domain:

(i) determining from an instruction code of said second instruction if said second instruction is a permitted instruction that is permitted to execute when commencing executing instructions associated with said second domain after accessing instruction associated with said first domain; and (ii) if said second instruction is not a permitted instruction, then triggering an access violation response; wherein:

said memory address space comprises a plurality of domains, each having respective programmable capabilities associated therewith indicating which of the domain transitions into the other domains are or are not to be subject to permitted instruction checking.

Viewed from a further aspect the present invention provides a computer program storage reader for a storing a computer program for controlling a computer to perform in accordance with the above described techniques.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
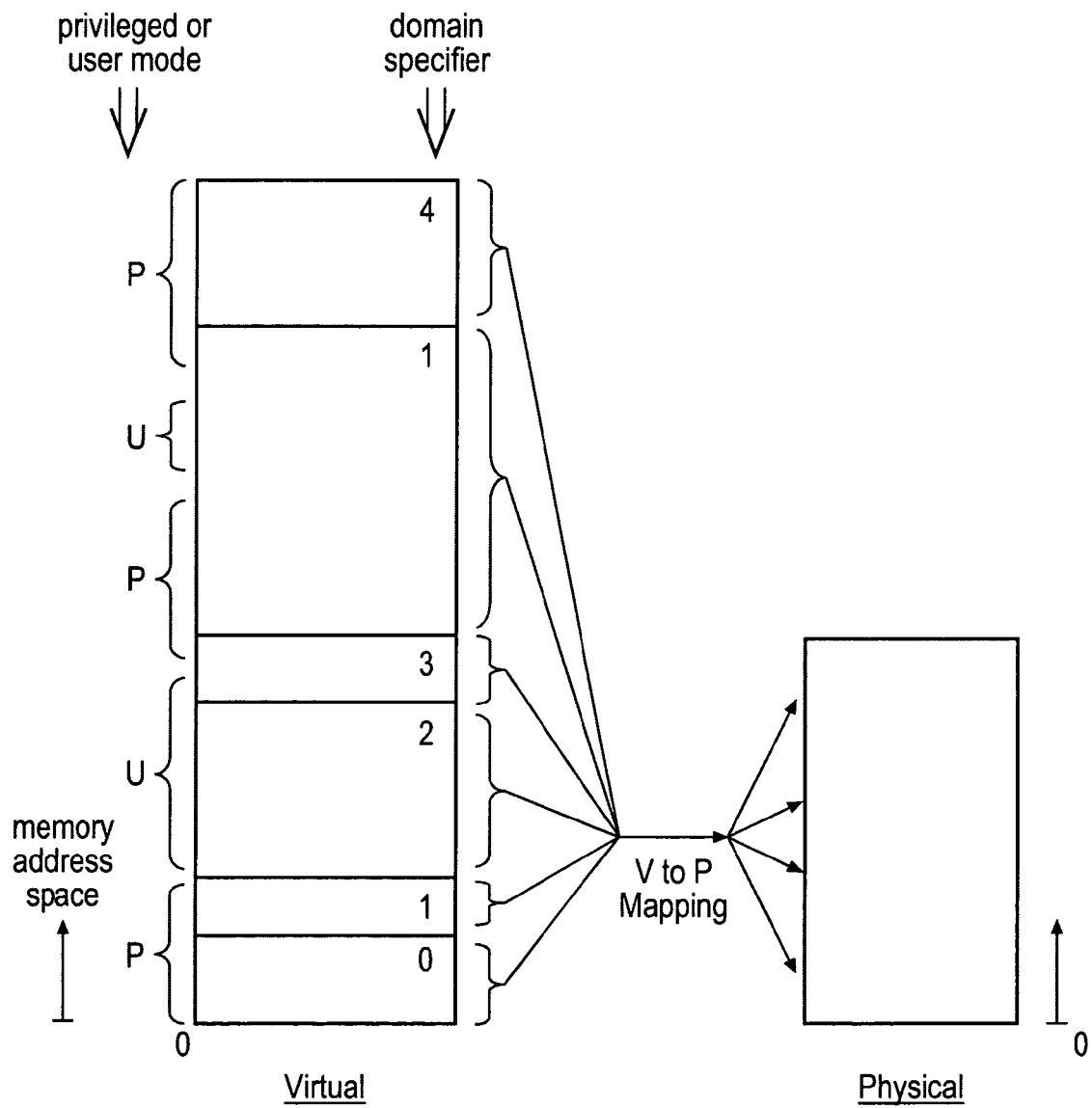
FIG. 1 schematically illustrates a relationship between virtual memory address space and physical memory address space.

FIG. 1 schematically illustrates a virtual memory address space divided into a plurality of memory domains, each having an associated domain specifier. It will be seen that these domains can have varying sizes and may be contiguous or non-contiguous. Also illustrated are access control data parameters associated with virtual memory addresses indicating whether particular regions of that virtual memory address space are accessible to only privileged mode processes or both user mode or privileged mode processes (p=privileged mode only: u=privileged mode or user mode). As illustrated, the various memory addresses within the virtual memory address space are mapped to physical addresses within the physical address space. A wide variety of such mappings are possible, as will be familiar to those in this technical field. The virtual to physical mapping is performed in dependence upon translation table data (page table data) which is stored within the memory address space itself and pointed to by a translation table pointer stored within a translation table pointer register. A memory management unit may also be provided to action such translation table data and to associate access control data (such as the privileged only, privileged/user data) with the different regions of memory. The domain specifiers can be domain specifiers of the form provided by processors operating in accordance with the ARM processor architecture as described in the ARM Architecture Reference Manual as provided by ARM Limited Cambridge, England. These domain specifiers (for example sixteen different domain specifiers) are provided already as a means of differentiating between different sets of memory addresses within the virtual memory address space in a manner which is utilised for other purposes different from the purposes of the present techniques. These domain specifiers can be reused for the current techniques.

Figure 2:
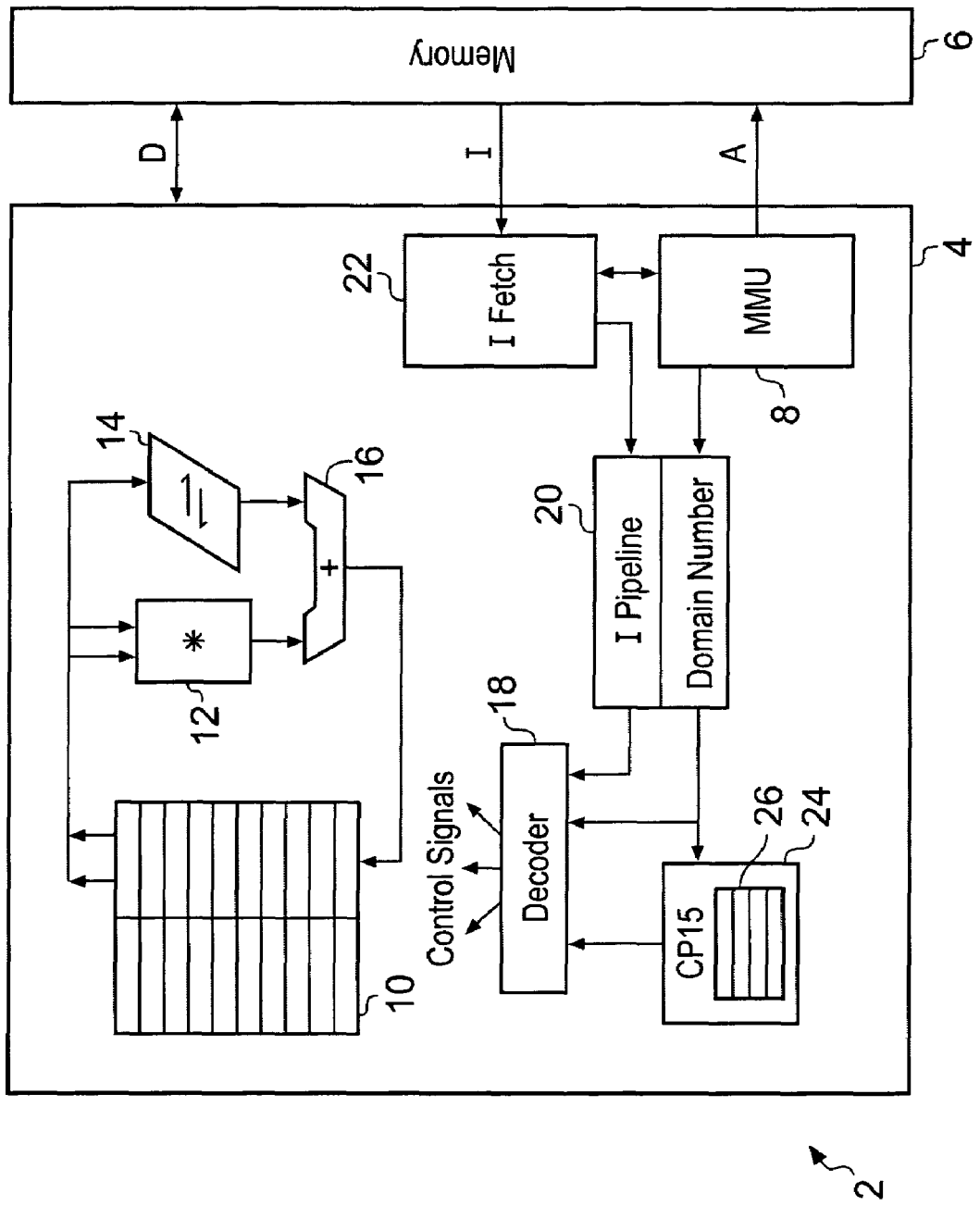
FIG. 2 schematically illustrates a data processing system incorporating memory access control circuitry, instruction access control circuitry and domain access control circuitry.

FIG. 2 illustrates a data processing system 2 comprising a processor core 4 coupled to a memory 6. The memory 6 provides a physically addressed memory address space storing both data and instructions. The processor core 4 executes program instructions utilising a virtual memory address space and an MMU 8 within the processor core 4 is responsible for controlling the process of mapping between virtual addresses and physical addresses. Data processing operations are performed in response to program instruction utilising a data path comprising a register bank 10, a multiplier 12, a shifter 14 and an adder 16. These data path elements 10, 12, 14, 16 act under the control of control signals generated by an instruction decoder 18, which is in turn responsive to instructions within an instruction pipeline 20. Instructions are supplied to the instruction pipeline 20 by an instruction fetch unit 22 which retrieves the instructions from the memory 6. A configuration coprocessor CP15 24 is provided which includes various configuration registers 26 used to configure the data processing system 2. These configuration registers 26 may be written to and read using coprocessor transfer instructions fetched from the memory 6 via the instruction fetch unit 22. The ability to write and read such configuration registers 26 is restricted by the domain access control circuitry. The domain access control circuitry is responsive to the domain of the address from which the program instruction seeking to change the configuration register 26 was fetched as read from the memory management unit 8. This information is passed as a domain specifier along with the instruction concerned within the instruction pipeline 20 until that instruction reaches the point at which it is to be executed. The configuration registers 26 include programmable capability registers specifying the capabilities associated with each of the different domains within the memory as will be described later herein.

The domain number is extracted from the section descriptor being used by the MMU 8 for the fetched instruction's virtual address. Conceptually, the domain number is used to obtain the capabilities afforded to that domain by looking up the appropriate configuration register (domain capabilities descriptor register) 26 resident in CP15 24. The instruction, the domain it was fetched from and the description of the capabilities afforded to the domain are fed (directly or indirectly) into the decoder 18, which determines whether the fetched instruction is allowed to execute or should generate an exception, e.g. if the instruction attempts to write to a CP15 register for which it doesn't have a capability, then an exception should be generated.

In some embodiments, the domain number itself need not be sent to the instruction decoder 18—only the capabilities assigned to the particular domain. However considering the properties of code locality, some embodiments may "cache" a local copy of a domain's capabilities—and then implement a state machine to confirm whether or not the actual domain number of the fetched instruction matches that of the cached copy—if not the new domain's capabilities will be fetched. This arrangement is likely to help improve the maximum frequency at which a design is able to run.

Also associated with the instruction pipeline 20, the instruction fetch unit 22 and the memory management unit 8 is instruction access control circuitry which serves to note when a change is made between domains from which instructions are being executed and if management for such transitions is indicated as in force then to check that the first instruction (or instruction at a fixed relation thereto) within the new domain is a permitted instruction (e.g. a member of a set of permitted instructions). These permitted instructions can be chosen to have encodings which correspond to no operation instructions for the elements within the data processing system 2 other than the instruction access control circuitry. The domain control circuitry by controlling access to the configuration registers 26, which include a pointer to the translation table, provides a means for restricting changes to the access control data employed by the memory management unit 8. Accordingly, it can resist unauthorised attempts to subvert the security provided by the memory management unit 8 which would result from reprogramming of the translation table data pointer to point to new translation table data providing unauthorised access to certain memory regions. It will be appreciated by those in this technical field that the data processing system 2 shown in FIG. 2 will typically include many further circuit elements but these have been omitted from FIG. 2 for the sake of clarity and are not necessary for an understanding of the current techniques.

Figure 3:
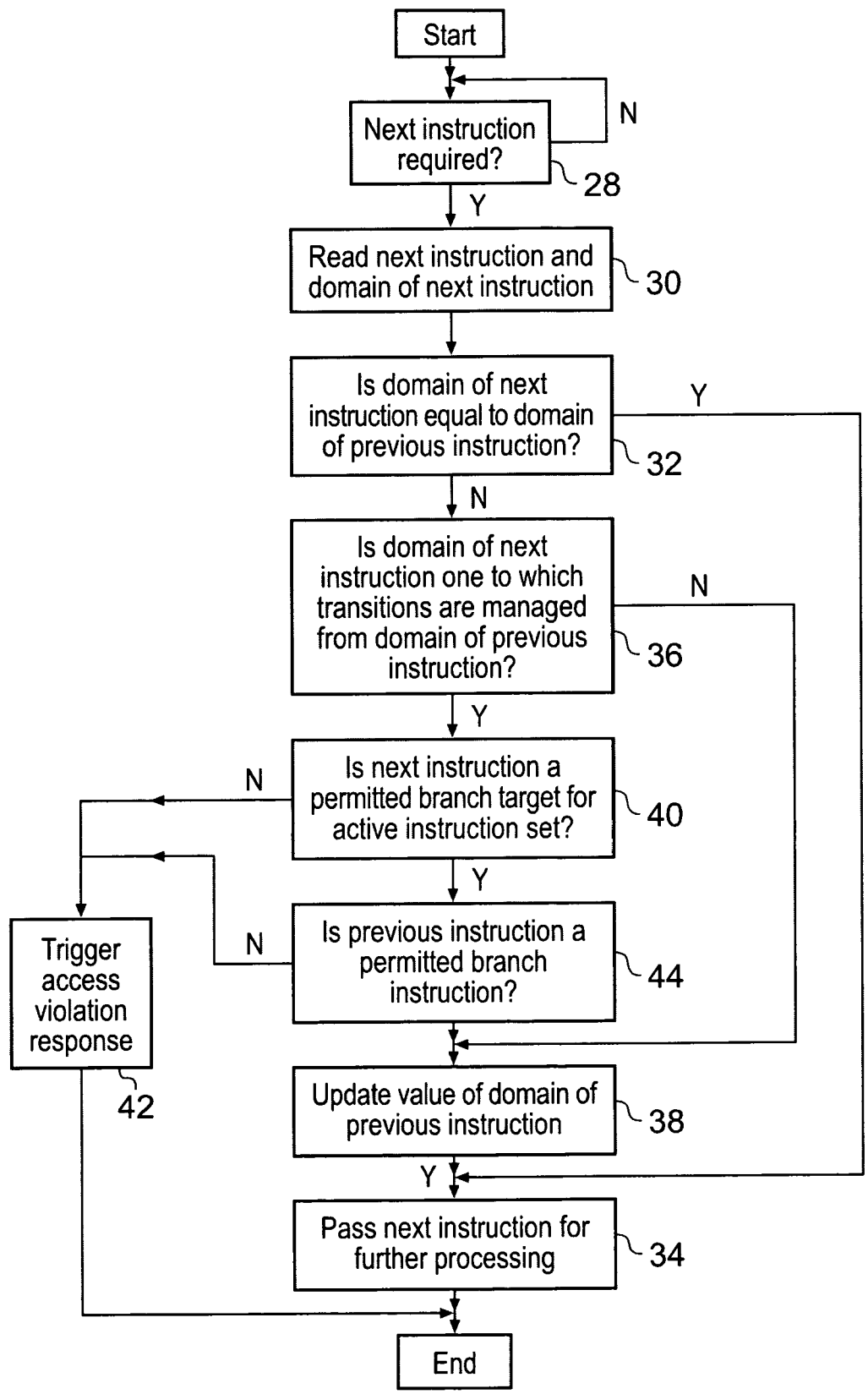
FIG. 3 is a flow diagram schematically illustrating the operation of checking for a permitted branch target instruction when moving from one domain to another domain.

FIG. 3 is a flow diagram schematically illustrating the operation of the instruction access control circuitry. At step 28 the processing waits until a next instruction is required to be fetched/executed. At step 28 when a next instruction is required, then the next instruction is fetched from the memory 6 and the domain of that next instruction read from the memory management unit 8 at step 30. Step 32 determines whether the domain of the next instruction is the same as the domain of the previous instruction (or an instruction at a fixed or programmable location preceding the next instruction). If the domain is the same and has not changed, then processing proceeds to step 34 at which the next instruction is passed for further processing. However, if the determination at step 32 that the domain has changed, then the processing proceeds to step 36.

Step 36 determines from the domain of the next instruction and the domain of the previous instruction whether or not the inter-domain transition concerned is one which is to be subject to control to ensure that the target instruction is a permitted target instruction. The selection of which inter-domain transitions are thus managed can be made using programmable capabilities registers with a programmable capability register associated with each domain and indicating for each domain which of the domains transitions into the other domains are or are not to be subject to permitted branch target instruction checking. If the determination at 36 is that the domain transition is not one which gives rise to branch target instruction checking, then processing proceeds to step 38 at which the value of the domain stored as the previous domain is updated (to reflect that a change of domain has occurred) and then processing proceeds to step 34 to pass the next instruction to further processing as previously discussed.

If the determination at step 36 was that the domain transition is one for which branch target instruction checking is to be performed, then processing proceeds to step 40 at which a determination is made as to whether or not the next instruction is a permitted branch target for the instruction set which is active for that next instruction. The data processing system 2 described in FIG. 2 may support multiple instruction sets (e.g. the ARM and Thumb instruction sets in the case of an ARM processor) and each of these instruction sets has its own set of one or more permitted branch target instructions. The permitted branch target instructions for different target instruction sets have different encodings. This avoids any ambiguity as to which instruction set is to be active at the branch target point. Certain branches may also involve an instruction set switch as part of the branch instruction (e.g. ARM/Thumb BLX instructions) and the active instructive set against which the permitted branch instruction targets are checked is based upon which instruction set will be active for that branch target taking into account any instruction set switching which is to accompany the branching operation. If the determination at step 40 is that the next instruction is not a permitted branch target instruction, then processing proceeds to step 42, at which an access violation response is triggered. This access violation response can take a variety of different forms including execution of specific access violation response code, execution of domain violation code shared with other domain violations when the domains are being used for more branch target checking, a memory abort (with appropriate exception code as necessary) or an undefined instruction exception. There are also many other types of possible access violation response and these may be chosen by the system designer. A particularly severe response would be to reset the system.

If the determination at step 40 was that the next instruction is a permitted branch target instruction, then processing proceeds to step 44 at which a determination is made as to whether or not the previous instruction was a permitted branch instruction. In this way, both the branch instruction and the branch target instruction can be checked to verify appropriate entry into a new memory domain from a permitted instruction and to a permitted instruction. It will be appreciated that the step of branch instruction checking performed at step 44 may be omitted if desired. If the branch instruction check performed at step 44 indicates that a previous instruction is not a permitted branch instruction, then processing proceeds to step 42 as previously described. If the previous instruction is a permitted branch instruction, then processing proceeds to step 38 as previously described and the value to be used as the domain value for the previous instruction in future comparisons is updated and then the next instruction is passed for further processing.

Figure 4:
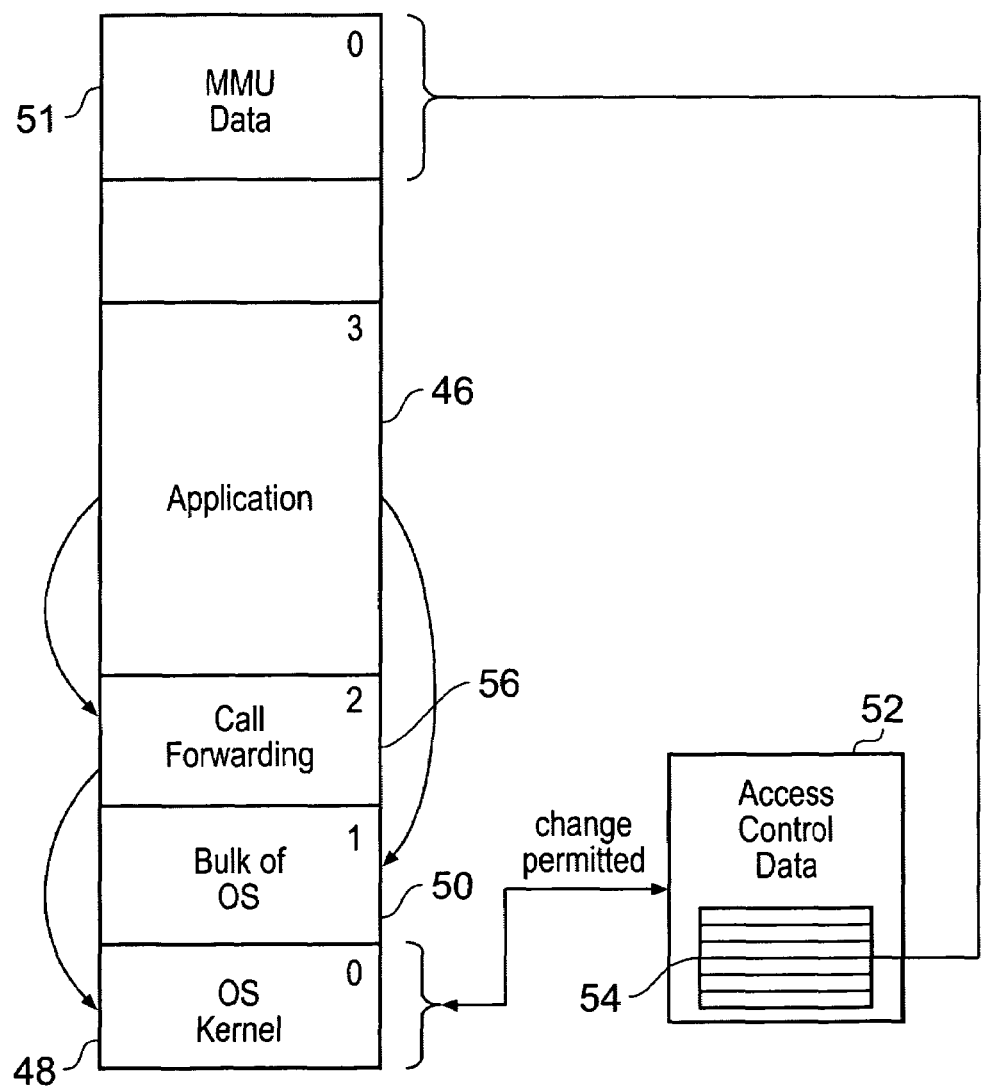
FIG. 4 is a diagram schematically illustrating a system in which a call forwarding program is used to forward application calls into a kernel of a operating system.

FIG. 4 schematically illustrates a system using a call forwarding program between an application program 46 and the kernel 48 of an operating system. Memory management unit data comprising access control data 51 is stored within the memory address space and access to this access control data is permitted only to the kernel 48. This effectively locks the access control data 51 such that it cannot be altered by the application code 46, or even the bulk of the operating system code 50. If a memory abort occurs when the application code is executing, then the exception handling for that memory abort which requires a page table walk through the access control data 51 to be performed is run using addresses generated on the basis of the physical address space and accordingly without requiring the application code 46 to have access to the access control data 51.

Also forming part of the access control data are data elements 52 which comprise control registers and pointers 54. These both point to the translation table data 51, as well as controlling and representing other access control parameters, (e.g. MMU enable/disable; translation table pointer; endianess configuration; access to capability control registers of the domains; access to which capability control register is currently selected etc). The ability to change the access control data 52, is in this example, reserved to the domain "0" illustrated in FIG. 4, which contains the operating system kernel 48 and the translation table data 51. The ability to change the domain capabilities, since it forms part of the access control data 52, is reserved to the operating system kernel. This increases resistance to subversion by unauthorised application code or unauthorised portions of code forming part of the bulk of the operating system 50.

As previously discussed, the application code 46 may wish to make a call to the kernel 48. In order to increase the security of the kernel 48, the access control data may be configured so as to provide no access (even read access) to the kernel 48 from the domain in which the application 46 is executing (i.e. domain 3). Accordingly, any attempt to make a direct call from application 46 to the kernel 48 would result in a memory abort as that area of memory would either simply be unmapped or denied for access by the user mode application program 46. Accordingly, when the application code 46 wishes to make a call to the kernel 48, it does so by first making a call to a call forwarding program 56. This call forwarding program is visible to the application code 46 and is in a separate domain (in this example domain 2). Domain 2 does have access to domain 0 in which the kernel resides and accordingly can pass the call forward into the kernel 48 and access the desired functionality of the kernel 48. Since the call forwarding program 56 has a relatively simple form dedicated to this function of call forwarding it can be small and readily verified as secure and not having been subject to alteration. Thus, the details of the operation of the kernel 48 can be hidden, access to the kernel can be controlled to be via authorised entry points and the mechanisms controlling the above security enhancements can be simple and in a form that is readily checked for its own integrity.

Figure 5:
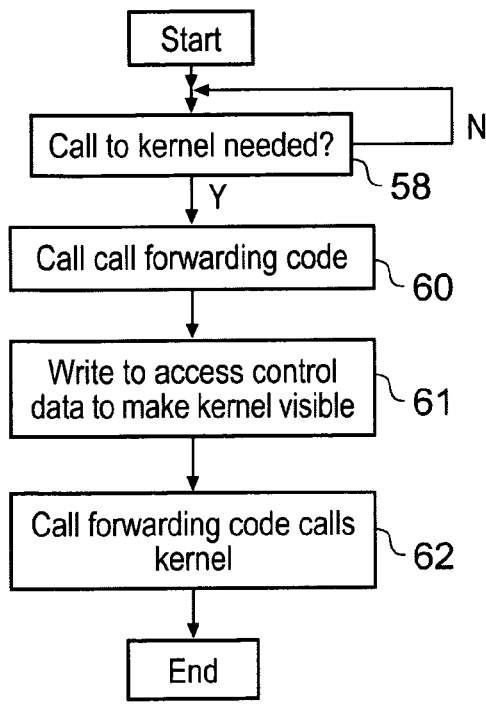
FIG. 5 is a flow diagram schematically illustrating the use of call forwarding code.

FIG. 5 is a flow diagram schematically illustrating the call forwarding processing discussed above. This technique can be used as an alternative to or an addition to the branch target instruction control discussed above. At step 58 the processing waits until there is a need to call the kernel 48. At step 60 a call is made to the call forwarding program 56. Step 61 uses the capability of the call forwarding code to write the access control data to alter this data so as to make the kernel code visible. At step 62 the call forwarding program 56 makes a call to the kernel 48 on behalf of the application code 46. When transferring back, the kernel passes to the call forwarding code, which then makes the kernel code invisible, before jumping back to the user code.

Figure 6:
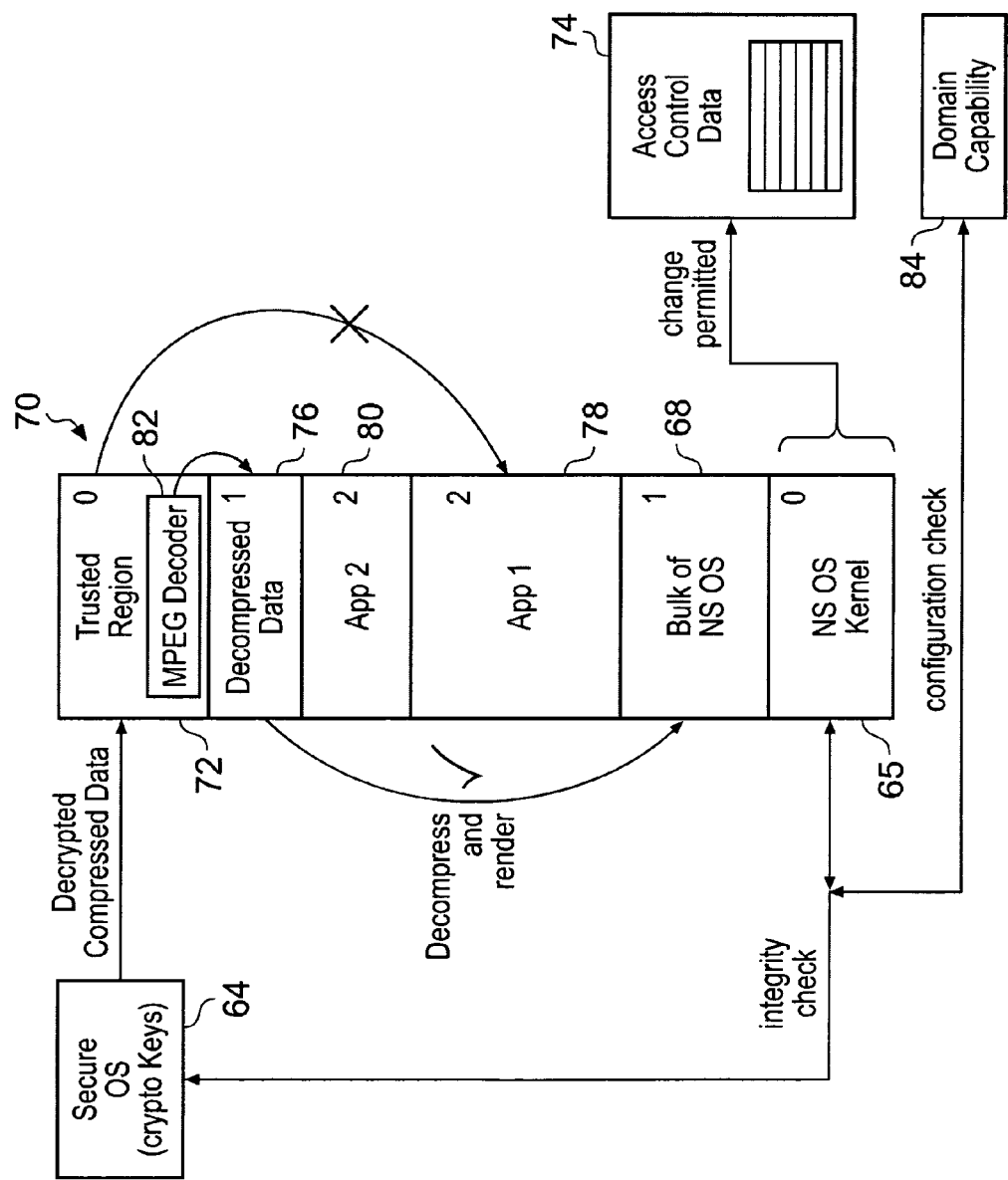
FIG. 6 is a diagram schematically illustrating the use of a trusted region of memory space into which a secure operating system can write data and from which a trusted program can read data when operating in a non-secure state.

FIG. 6 is a diagram schematically illustrating the operating system including a secure operating system 64 operating in a secure state and a non secure operating system 66, 68 operating in a non-secure state. The secure state and the non-secure state are provided in accordance with the TrustZone architecture and mechanisms of the processors produced by ARM Limited Cambridge England. For each of the secure and non-secure physical address spaces the virtual memory address space 70 is divided into number domains. Domain 0 contains the kernel 66 of the non-secure operating system and a trusted region of memory 72. The kernel 66 of the non-secure operating system is responsible for controlling the access control data 74 as previously discussed. This access control data 74 controls which memory regions are able to be accessed by which levels of privilege and by which domains. The access to the trusted region 72 is restricted to the non-secure kernel 66 and these share a common domain, i.e. domain 0. The bulk of the non-secure operating system 68 is in domain 1 as well as a memory region 76 used to store decompressed data. This decompressed data in region 76 is accessible to the bulk of the operating system 68 is, but not accessible to application programs 78, 80 stored within domain 2.

The system of FIG. 6 is able to provide layered levels of security. The most secure data corresponding to cryptographic keys is restricted to be accessed only by the secure operating system 64 and exists in secure physical address space. The secure operating system 64 can use these cryptographic keys to decrypt requested data and write this decrypted compressed data to a trusted region 72 belonging to the non-secure operating system 66. This decrypted compressed data whilst not as sensitive in nature as the cryptographic keys nevertheless represents an asset which is desired to protect and has a level of security associated with it. Accordingly, the trusted region 72 is only accessible to program instructions executing within the domain 0, which has the highest security level. These trusted programs include the kernel 68 and an MPEG decoder program 82, which is stored within the trusted region 72 itself. The MPEG decoder program 82 decompresses the decrypted compressed data and writes this into a decompressed data region 76. This decompressed data region 76 is not accessible to the application programs 78, 80, but is accessible to the bulk of the non-secure operating system 68. Accordingly, the rendering mechanisms associated with the bulk of the non-secure operating systems 68 can be used to render the decompressed data and draw it to a screen, for example.

Prior to the secure operating system 62 writing the decrypted data into the trusted region 72, it can perform integrity checks upon the kernel 66 and the configuration of the domains as specified in the domain capability data 84 (stored within the domain capabilities registers described later). This integrity check may be in the form of a check summing, hashing or signature checking operation performed upon the relatively small kernel 66 as well as a configuration check upon the domain capability data 84 comprising ensuring that only the kernel 66 is provided with the ability to access control data which will control which of the software executing in the non-secure state will be able to access the trusted region 72. Providing the kernel 66 is verified and only the kernel 66 has the necessary capability to change the access control data, then reasonable confidence can be had that the trusted region 72 is secure. Thus, the secure operating system 64 will devolve some of the processing required into the non-secure domain and thus enable the secure operating system to be simpler and accordingly more secure.

Figure 7:
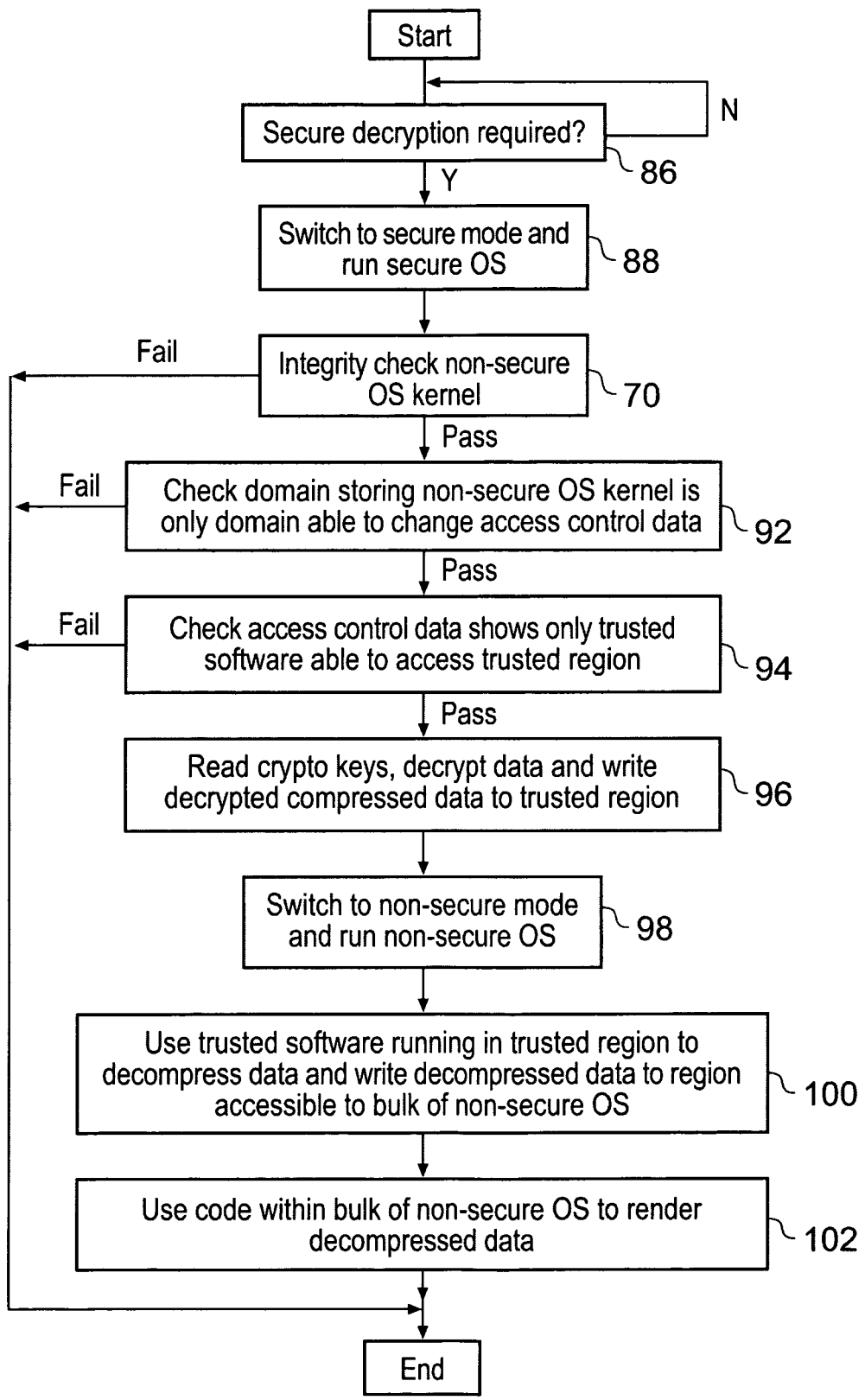
FIG. 7 is a flow diagram schematically illustrating a sequence of processing operations performed using the system illustrated in FIG. 6.

FIG. 7 is a flow diagram illustrating operation of the system of FIG. 6. At step 86 it is determined that secure decryption is required. At step 88, a switch is made to the secure state and the secure operating system is run. At step 90 the secure operating system integrity checks the non-secure operating system kernel 66. If this check fails, then processing terminates. If this check passes, then processing proceeds to step 92 at which a determination of the domain capability data 84 is made to ensure that the domain storing the non-secure operating system kernel 66 is the only domain able to change the access control data 74. If this check fails, then processing again terminates. If this check is passed, then processing proceeds to step 94 at which a determination is made that the access control data 74 shows that only trusted software (e.g. the non-secure operating system 66 and the MPEG decoder 82) is able to access the trusted region 72. If this check fails, then processing terminates. If this check is passed, then processing proceeds to step 96 at which the cryptographic keys are read by the secure operating system 64 (or supplied to an appropriate cryptographic engine) and decryption performed to generate decrypted compressed data which is written to the trusted region 72. Step 98 then switches to the non-secure state and the non-secure operating system is run. Step 100 uses trusted software 82 (MPEG decoder) running in the trusted region 72 to decompress the decrypted compressed data and to write the decompressed data into a decompressed data region 76 which is accessible to the bulk of the non-secure operating system 68. Step 102 then uses a program code within the bulk of the non-secure operating system 68 to render the decompressed data and draw it to, for example, a computer screen.

Figure 8:
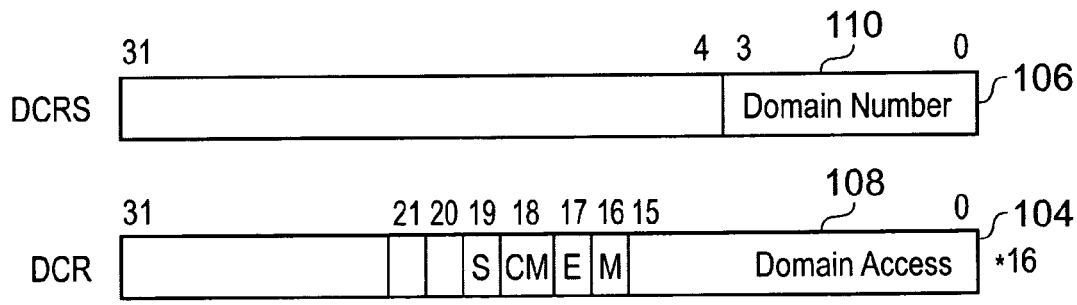
FIG. 8 is a diagram schematically illustrating programmable capability data associated with different domains within the memory address space.

FIG. 8 illustrates schematically the domain capabilities registers 104 and the domain capabilities select register 106. There are sixteen domain capability registers 104 with one being provided for each of the sixteen different domains into which the memory address space (virtual or physical) can be divided. Domain access data 108 for each domain indicates in respect of each of the fifteen other domains whether or not access to that other domain is free, managed or not permitted. Managed access will include the instruction access checking previously described to ensure that transitions into that domain from the current domain, corresponding to the control register 104 in question, are to permitted branch target instructions, and possibly from permitted branch instructions. Various flags within the main control register 104 also specify settings relating to the general memory management, such as MMU enable/disable, a translation table pointer, register access capability, the ability to change endianess, the ability to change the domain capability registers 104 themselves or the domain capability registers select register 106. The domain capability register 104 also includes exception controlling flags which, for example, control whether or not program instructions executing in that the domain are able to change vector table pointers and switch on or off a particular response associated with exceptions and other activity. Further flags corresponding to items of system management which it is desired to control on a domain-by-domain basis within the domain capabilities registers 104 can include capabilities such as whether or not cache maintenance can be turned on or off in that domain. One flag, S, controls the ability to execute SMC instructions which are software interrupts used for changing between the secure and non-secure states.

The domain capability register select register 106 includes a domain number field 110 which specifies that the number of the domain capability register 104 currently mapped in for reading and writing if the domain concerned has the appropriate permissions to read and write that domain capability register (see Flags M).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
    a memory addressable with a memory address having a value within a memory address space, said memory address space having at least a first domain and a second domain, a domain comprising a set of memory addresses;
    instruction fetching circuitry coupled to said memory and operable to fetch a sequence of program instructions using respective memory addresses within said memory address space;
    instruction access control circuitry coupled to said instruction fetching circuitry and responsive to a fetch of a first instruction associated with a first memory address within said first domain followed by a fetch of a second instruction associated with a second memory address within said second domain:
    (i) to determine from an instruction code of said second instruction if said second instruction is a permitted branch target instruction that is permitted to execute when commencing executing instructions associated with said second domain after accessing instruction associated with said first domain; and
    (ii) if said second instruction is not a permitted instruction, then to trigger an access violation response; wherein:
    said memory address space comprises a plurality of domains, each having respective programmable capabilities associated therewith indicating which of the domain transitions into the other domains are or are not to be subject to permitted instruction checking, wherein said apparatus uses a plurality of program instruction sets, each program instruction set has at least one permitted branch target instruction and said instruction access control circuitry determines whether said second instruction is one of said at least one permitted branch target instructions for the instruction set that contains said second instruction.

2. Apparatus as claimed in claim 1, wherein said permitted instruction is processed as a no operation instruction by processing circuitry of said apparatus other than said instruction access control circuitry.

3. Apparatus as claimed in claim 1, wherein said programmable capabilities for said first domain indicate for which other of said plurality of domains when being said second domain said instruction access control circuitry is or is not active to control access in dependence upon whether said second instruction is a permitted instruction.

4. Apparatus as claimed in claim 1, wherein said programmable capabilities for said second domain indicate for which other of said plurality of domains when being said first domain said instruction access control circuitry is or is not active to control access in dependence upon whether said second instruction is a permitted instruction.

5. Apparatus as claimed in claim 1, wherein said programmable capabilities for each domain include whether or not program instructions associated with that domain can alter said programmable capabilities for said plurality of domains.

6. Apparatus as claimed in claim 1, wherein said instruction access control circuitry also determines if said first instruction is a permitted branch instruction and if said first instruction is not a permitted branch instruction then triggers said access violation response.

7. Apparatus as claimed in claim 1, wherein, when an exception occurs between said first instruction and said second instruction, a saved status register stores data identifying said first domain, such that upon a return from processing said exception, said instruction access control circuitry can identify said first domain of said first instruction so as to control access to said second instruction.

8. Apparatus as claimed in claim 1, wherein said memory address space is a virtual memory address space associated with said memory, said first domain and said second domain are domains within said virtual memory address space and memory management circuitry maps virtual memory addresses to physical memory addresses.

9. Apparatus as claimed in claim 8, wherein domain specifying data indicating which virtual memory addresses correspond to which domains is stored in said memory management circuitry.

10. Apparatus as claimed in claim 1, wherein data specifying said programmable capabilities of said plurality of domains is stored within one or more programmable configuration registers.

11. Apparatus as claimed in claim 1, wherein said access violation response is one of:
execution of domain violation exception handling code
a memory abort;
execution of access violation exception handling code; and
execution of undefined instruction exception handling code.

12. A method of processing data, said method comprising the steps of:
storing program instructions within a memory addressable with a memory address having a value within a memory address space, said memory address space having at least a first domain and a second domain, a domain comprising a set of memory addresses;
fetching a sequence of program instructions using respective memory addresses within said memory address space;
in response to a fetch of a first instruction associated with a first memory address within said first domain followed by a fetch of a second instruction associated with a second memory address within said second domain:
(i) determining from an instruction code of said second instruction if said second instruction is a permitted branch target instruction that is permitted to execute when commencing executing instructions associated with said second domain after accessing instruction associated with said first domain; and
(ii) if said second instruction is not a permitted instruction, then triggering an access violation response; wherein:
said memory address space comprises a plurality of domains, each having respective programmable capabilities associated therewith indicating which of the domain transitions into the other domains are or are not to be subject to permitted instruction checking, wherein said processing uses a plurality of program instruction sets, each program instruction set has at least one permitted branch target instruction and further comprising determining whether said second instruction is one of said at least one permitted branch target instructions for the instruction set that contains said second instruction.

13. A method as claimed in claim 12, wherein said permitted instruction is processed as a no operation instruction other than in controlling generation of said access violation response.

14. A method as claimed in claim 12, wherein when said programmable capabilities for said first domain indicate for which other of said plurality of domains when being said second domain access is controlled in dependence upon whether said second instruction is a permitted instruction.

15. A method as claimed in claim 12, wherein said programmable capabilities for said second domain indicate for which other of said plurality of domains when being said first domain said instruction access control circuitry is or is not active to control access in dependence upon whether said second instruction is a permitted instruction.

16. A method as claimed in claim 12, wherein said programmable capabilities for each domain include whether or not program instructions associated with that domain can alter said programmable capabilities for said plurality of domains.

17. A method as claimed in claim 12, further comprising determining if said first instruction is a permitted branch instruction and if said first instruction is not a permitted branch instruction then triggers said access violation response.

18. A method as claimed in claim 12, further comprising, when an exception occurs between said first instruction and said second instruction, storing data identifying said first domain, such that upon a return from processing said exception, said first domain of said first instruction can be identified so as to control access to said second instruction.

19. A method as claimed in claim 12, wherein said memory address space is virtual memory address space associated with said memory, said first domain and said second domain are domains within said virtual memory address space and virtual memory addresses are mapped to physical memory addresses.

20. A method as claimed in claim 19, wherein domain specifying data indicating which virtual memory addresses correspond to which domains is stored in with data specifying a mapping from virtual memory addresses to physical memory addresses.

21. A method as claimed in claim 12, wherein data specifying said programmable capabilities of said plurality of domains is stored within one or more programmable configuration registers.

22. A method as claimed in claim 12, wherein said access violation response is one of:

execution of domain violation exception handling code a memory abort;
execution of access violation exception handling code; and
execution of undefined instruction exception handling code.

23. A computer program storage medium storing a computer program for controlling a computer to perform a method as claimed in claim 12.

* * * * *